UNITED STATES PATENT OFFICE.

DAVID LICHTENSTEIN, OF CHICAGO, ILLINOIS.

COMPOSITION OF MATTER.

No. 809,068.  Specification of Letters Patent.  Patented Jan. 2, 1906.

Application filed July 15, 1904. Serial No. 216,757.

*To all whom it may concern:*

Be it known that I, DAVID LICHTENSTEIN, a citizen of the United States, residing at Chicago, in the county of Cook and State of Illinois, have invented certain new and useful Improvements in Composition of Matter, of which the following is a specification.

My invention relates to a composition of matter embodying such ingredients as to form an adhesive substance possessing properties that make sure the firm union of two or more textile fabrics, leather, or a woven fabric and leather, whether of the same or different colors. This composition consists of the following ingredients in about the proportion stated, to wit: French glue, one-half pound; shellac, two ounces; a solvent such as alcohol, one ounce; water, one gallon; starch, one-half pound; glycerin, one ounce; ammonia, one-half ounce; alum, one ounce. For the purpose of giving any particular color or tint to the composition any suitable coloring-matter and in any desired quantity may be used; but the coloring-matter is not essential to the effectiveness of the composition. The most essential of these ingredients are French glue, shellac, an alcoholic solvent, starch, and water; but the ingredients glycerin, ammonia, and alum each contributes more or less to the perfection of the composition. This adhesive substance may be prepared by placing the French glue, shellac, and alcoholic solvent in a container over night or until the solids are thoroughly dissolved. The starch should be mixed with water for about two hours. Then these two mixtures and the glycerin, ammonia, alum, and coloring-matter, if any is desired, should be assembled in a suitable vessel for commingling by agitation or otherwise and the application of heat during or after such operation. It has been found that agitation in the presence of heat improves the composition. One way to apply heat is to introduce steam at or near the bottom of the vessel containing the mixture and subject it to the action of live steam for about five minutes.

One manner of applying my improved adhesive substance is to apply the same while in a heated condition to the woven fabric, leather, or cloth and leather, drawn taut or stretched, the substance being applied to adjacent sides of the material and both pieces pressed to form one piece of material before the substance loses its heat, or the adhesive substance may be applied to one surface of the material and permitted to cool, and at any time thereafter such treated surface and one surface of cloth previously moistened may be brought together, heat applied, and both pieces pressed together to become in appearance a single piece.

Having thus fully described my invention, what I claim as new, and desire to secure by Letters Patent, is—

1. The herein-described composition of matter consisting of French glue, shellac, a solvent, starch and water, substantially as and for the purpose specified.

2. A composition of matter consisting of French glue, shellac, an alcoholic solvent, starch, water, and alum, substantially as specified.

3. As a new composition of matter the mixture containing French glue, shellac, a solvent, starch, water, alum, and ammonia, substantially as specified.

4. The herein-described composition of matter, consisting of French glue, shellac, a solvent, starch, water, alum, ammonia, and glycerin, substantially as specified.

5. As a new composition of matter the mixture containing French glue, shellac, alcohol, starch, water, alum, ammonia, and glycerin, substantially as specified.

6. The herein-described composition of matter consisting of French glue, shellac, alcohol, starch, water, alum, ammonia, glycerin, and coloring-matter, substantially as specified.

7. The herein-described composition of matter consisting of French glue, shellac, an alcoholic solvent, starch, and water commingled in the presence of heat, substantially as specified.

8. The herein-described composition of matter consisting of French glue, shellac, an alcoholic solvent, starch, and water commingled in the presence of steam, substantially as specified.

9. As a new composition of matter the mixture containing French glue, shellac, alcohol, starch, and water agitated and commingled in the presence of live steam, substantially as specified.

10. The herein-described composition of matter consisting of French glue, shellac, an alcoholic solvent, starch, water, and glycerin commingled in the presence and by the action of steam, substantially as specified.

11. The herein-described composition of matter consisting of French glue, shellac, alcohol, starch, water, glycerin, and ammonia agitated and commingled in the presence of heat, substantially as specified.

12. The herein-described composition of matter consisting of French glue, shellac, alcohol, starch, water, glycerin, ammonia, and alum commingled in the presence of heat, substantially as specified.

13. The herein-described composition of matter consisting of French glue, shellac, alcohol, starch, water, glycerin, ammonia, alum, and coloring-matter commingled in the presence of heat, substantially as specified.

14. As a new composition of matter the mixture consisting of French glue, shellac, an alcoholic solvent, starch, water, and coloring-matter substantially as and for the purpose specified.

15. A composition of matter consisting of French glue, shellac, an alcoholic solvent, starch, water, and glycerin, substantially as specified.

16. A composition of matter consisting of French glue, shellac, an alcoholic solvent, starch, water, and ammonia, substantially as specified.

17. A composition of matter consisting of French glue, shellac, an alcoholic solvent, starch, water, alum, and coloring-matter, substantially as specified.

18. A composition of matter consisting of French glue, shellac, an alcoholic solvent, starch, water, glycerin, and coloring-matter, substantially as specified.

19. A composition of matter consisting of French glue, shellac, an alcoholic solvent, starch, water, ammonia, and coloring-matter, substantially as specified.

20. A composition of matter consisting of French glue, shellac, alcohol, starch, water, and coloring-matter agitated and commingled in the presence of steam, substantially as specified.

In testimony whereof I have signed my name to this specification in presence of two subscribing witnesses.

DAVID LICHTENSTEIN.

Witnesses:
LINCOLN E. TAYLOR,
SAMUEL LEOPOLD HIRSCH.